Patented Sept. 22, 1931

1,824,273

UNITED STATES PATENT OFFICE

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR DYEING REGENERATED CELLULOSE MATERIALS

No Drawing.   Application filed September 11, 1928.   Serial No. 305,381.

This invention relates to a process for dyeing regenerated cellulose materials and to the resulting product.

As is well known, the dyeing of regenerated cellulose material, such as viscose and rayon, is a difficult task, as most ordinary cotton dyes will produce uneven dyeings. The surprising discovery has been made that certain disazo dyes will give very level shades on these fibers. This invention therefore relates particularly to processes for dyeing regenerated cellulose material with disazo dyes of the following general formula:

$R_1$ being a naphthyl-monosulphonic acid, $R_2$ being an aromatic radical not containing a free hydroxyl- or amino group, and $R_3$ being 2-amino-5-naphthol-7-sulphonic acid or an N-substituted derivative thereof. The shades obtained by various combinations vary from a bluish-red to a bluish-violet to blue.

By way of illustration the following example is furnished showing a method for applying dyes of this type:

100 parts of rayon (knit or woven material) are circulated in a bath of 4000 parts of water and 2 parts of neutral soap for about 10 minutes at a temperature of 40° C. Then there is added slowly a concentrated solution of one part of the dye No. 17 (1-naphthylamine-7-sulphonic acid - m - toluidine - 2 - amino-5-naphthol-7-sulphonic acid), after which the temperature is raised within 20 minutes to 70° C. Then 10% Glauber's salt (crystals) is added within 15 minutes, maintaining a temperature of 70–80° C. Continue dyeing for about 10 minutes longer, after which the material is rinsed in water and dried. A very even, bright Bordeaux shade will be obtained.

The amount of Glauber's salt employed may vary between about 10 to 30% (based on the material to be dyed) or it may be substituted by sodium chloride, in which case about 5 to 15% will be required. For heavier dyeings the larger percentage of salt would be advisable.

The neutral soap may be substituted by a soluble oil, as double sulphonated castor oil. The duration of the treatment and the temperature at which it is carried out may be varied within wide limits. However, the best results have been obtained when operating at a temperature between 40° and 90° C.

The dye employed in the example may, of course, be substituted by a large number of dyes having the general formula indicated above. The table following lists a number of shades, obtained by various combinations, to which a large number of similar combinations may be added:—

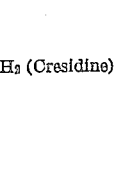

|     | First component | Middle component | End component | Shade |
|-----|-----------------|------------------|---------------|-------|
| (1) | 2-naphthylamine-6-sulphonic acid | Aniline | 2-amino-5-naphthol-7-sulphonic acid | Bluish-red |
| (2) | Same | Same | Phenyl-2-amino-5-naphthol-7-sulphonic acid | Reddish-violet |
| (3) | Same | Cresidine (OCH₃, CH₃, NH₂ substituted benzene) | 2-amino-5-naphthol-7-sulphonic acid | Reddish-violet |
| (4) | Same | Same | Phenyl-2-amino-5-naphthol-7-sulphonic acid | Bluish-violet |
| (5) | Same | 1-naphthylamine-6-sulphonic acid | 2-amino-5-naphthol-7-sulphonic acid | Reddish-violet |
| (6) | Same | Same | Phenyl-2-amino-5-naphthol-7-sulphonic acid | Bluish-violet |
| (7) | Same | m-toluidine | 2-amino-5-naphthol-7-sulphonic acid | Bright Bordeaux |
| (8) | Same | Same | Phenyl-2-amino-5-naphthol-7-sulphonic acid | Reddish violet |

| | | First component | Middle component | End component | Shade |
|---|---|---|---|---|---|
| | (9) | 1-naphthylamine-4-sulphonic acid | Same | 2-amino-5-naphthol-7-sulphonic acid | Bordeaux |
| | (10) | Same | 1-naphthylamine | Same | Violet |
| | (11) | 1-naphthylamine-5-sulphonic acid | Aniline | Phenyl-2-amino-5-naphthol-7-sulphonic acid | Bordeaux |
| | (12) | Same | m-toluidine | 2-amino-5-naphthol-7-sulphonic acid | Bordeaux |
| | (13) | 1-naphthylamine-5-sulphonic acid | 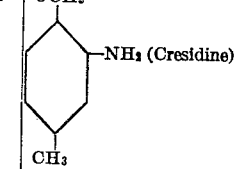 (Cresidine) | Phenyl-2-amino-5-naphthol-7-sulphonic acid | Bright bluish-violet |
| | (14) | Same | 1-naphthylamine-7-sulphonic acid | Same | Bright bluish-violet |
| | (15) | Same | 1-naphthylamine | Same | Reddish-blue |
| | (16) | Same | 1-naphthylamine-7-sulphonic acid | Benzoyl-2-amino-5-naphthol-7-sulphonic acid | Violet |
| | (17) | 1-naphthylamine-7-sulphonic acid | m-toluidine | 2-amino-5-naphthol-7-sulphonic acid | Bright Bordeaux |
| | (18) | Same | Same | Acetyl-2-amino-5-naphthol-7-sulphonic acid | Bordeaux |
| | (19) | Same | Same | Phenyl-2-amino-5-naphthol-7-sulphonic acid | Reddish-violet |

The dyes may be prepared, as for instance in case 14, by diazotizing 1-naphthylamine-5-sulphonic acid, coupling the diazo compound to 1-naphthylamine-7-sulphonic acid, diazotizing the amino azo compound again and coupling it to phenyl-2-amino-5-naphthol-7-sulphonic acid. The other dyes may be made in a similar way.

As many apparently widely different embodiments of this invention may be made without departing from the spirit and scope thereof, it is to be understood that I do not limit myself to the specific embodiments thereof except as defined in the appended claims.

I claim:

1. The process of coloring regenerated cellulose materials which comprises applying thereto a dye of the formula:

$$R_1-N=N-R_2-N=N-R_3$$

$R_1$ being a naphthyl-monosulphonic acid, $R_2$ being an aromatic radical not containing a free hydroxyl- or amino group, and $R_3$ being 2-amino-5-naphthol-7-sulphonic acid or an N-substituted derivative thereof.

2. The process of coloring regenerated cellulose materials which comprises treating the same with a dye of the formula:

$$R_1-N=N-R_2-N=N-R_3$$

($R_1$ being a naphthyl-monosulphonic acid, $R_2$ being an aromatic radical not containing a free hydroxyl- or amino group, and $R'$ being 2-amino-5-naphthol-7-sulphonic acid or an N-substituted derivative thereof) in a neutral bath containing a salt of the group consisting of sodium sulphate and sodium chloride.

3. The process of coloring regenerated cellulose materials which comprises treating the same with a dye of the formula:

$$R_1-N=N-R_2-N=N-R_3$$

($R_1$ being a naphthyl-monosulphonic acid, $R_2$ being an aromatic radical not containing a free hydroxyl- or amino group, and $R_3$ being 2-amino-5-naphthol-7-sulphonic acid or an N-substituted derivative thereof) in a neutral bath containing from 10 to 30% sodium sulphate (based on the weight of the material to be dyed) and at a temperature between 50° and 90° C.

4. The process of coloring regenerated cellulose materials which comprises applying thereto, the dye obtained by diazotizing 1-naphthylamine-7-sulphonic-acid, coupling the resulting diazo compound to m-toluidine, diazotizing the intermediate amino-azo-compound and finally coupling the resulting diazo azo compound in an alkaline medium to 2-amino-5-naphthol-7-sulphonic acid.

5. A regenerated cellulose material dyed with a dye having the formula:

$$R_1-N=N-R_2-N=N-R_3$$

$R_1$ being a naphthyl-monosulphonic acid, $R_2$ being an aromatic radical not containing a free hydroxyl- or amino group, and $R_3$ being 2-amino-5-naphthol-7-sulphonic acid or an N-substituted derivative thereof.

In testimony whereof, I affix my signature.

HENRY JORDAN.

Certificate of Correction

Patent No. 1,824,273.  Granted September 22, 1931, to

HENRY JORDAN

It is hereby certified that error appears in the printed specification of the above-numbered patent requiring correction as follows: Page 2, line 61, claim 2, for the letter and character "$R^6$" read $R_3$; and that the said Letters Patent should be read with this correction therein that the same may conform to the record of the case in the Patent Office.

Signed and sealed this 20th day of October, A. D. 1931.

[SEAL.]

M. J. MOORE,
*Acting Commissioner of Patents.*